United States Patent [19]

Ma

[11] Patent Number: 5,161,493
[45] Date of Patent: Nov. 10, 1992

[54] PHASE CHANGE MECHANISM

[75] Inventor: Thomas T. Ma, Chelmsford, England

[73] Assignee: Ford Motor Company, Dearborn, Mich.

[21] Appl. No.: 775,947

[22] PCT Filed: Mar. 7, 1990

[86] PCT No.: PCT/GB90/00347

§ 371 Date: Oct. 25, 1991

§ 102(e) Date: Oct. 25, 1991

[87] PCT Pub. No.: WO90/10788

PCT Pub. Date: Sep. 20, 1990

[30] Foreign Application Priority Data

Mar. 15, 1989 [GB] United Kingdom ............... 8905944

[51] Int. Cl.$^5$ ................................................. F01L 1/34
[52] U.S. Cl. ............................ 123/90.17; 123/90.31; 464/1; 464/160
[58] Field of Search ............... 123/90.15, 90.17, 90.31; 464/1, 2, 160

[56] References Cited

U.S. PATENT DOCUMENTS

| | | | |
|---|---|---|---|
| 4,305,352 | 12/1981 | Oshima et al. | 123/90.31 |
| 5,056,478 | 10/1991 | Ma | 123/90.17 |
| 5,117,784 | 6/1992 | Schechter et al. | 123/90.17 |

FOREIGN PATENT DOCUMENTS 2224094 4/1990 United Kingdom ............. 123/90.17

Primary Examiner—Tony M. Argenbright
Assistant Examiner—Weilun Lo
Attorney, Agent, or Firm—Jerome R. Drouillard; Roger L. May

[57] ABSTRACT

A phase change mechanism for a camshaft of an internal combustion engine comprises a drive member to be connected to the camshaft drive train, a driven member to be connected to the camshaft, a coupling element interposed between, and movable relative to, the drive and driven members, and means connecting the coupling element for rotation with the drive and driven members in such a manner that the phase of the driven member relative to the drive member is dependent upon the position of the coupling element. The connecting means is designed to permit the coupling element to move between two stable end positions lying on a line generally perpendicular to the axis of rotation of the phase drive and driven members, and a reaction member is connected to the coupling element by a cranking means which causes the coupling element to move from one stable end position towards the other in response to the application of a torque acting to vary the speed of rotation of the reaction member relative to the drive and driven members.

10 Claims, 3 Drawing Sheets

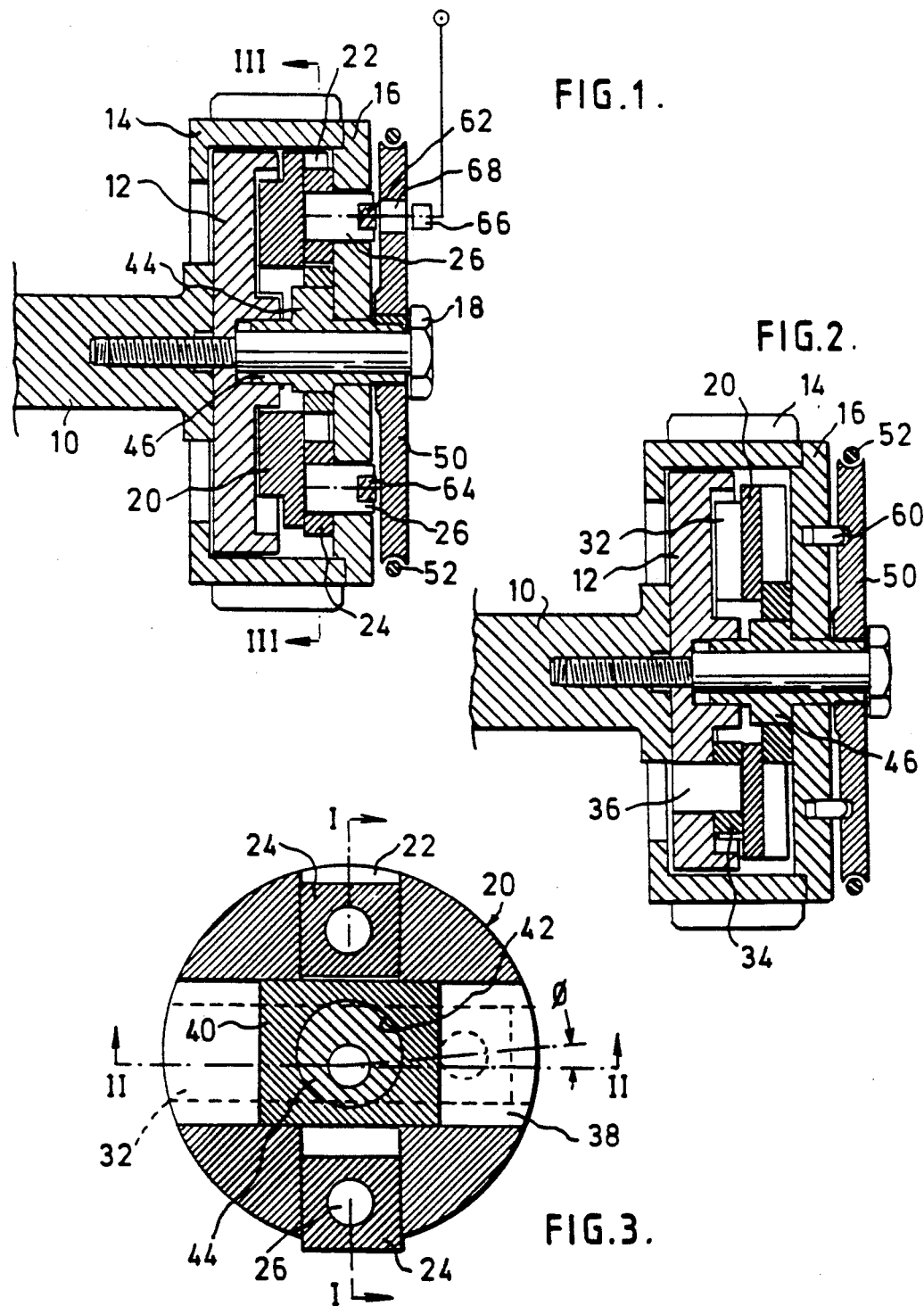

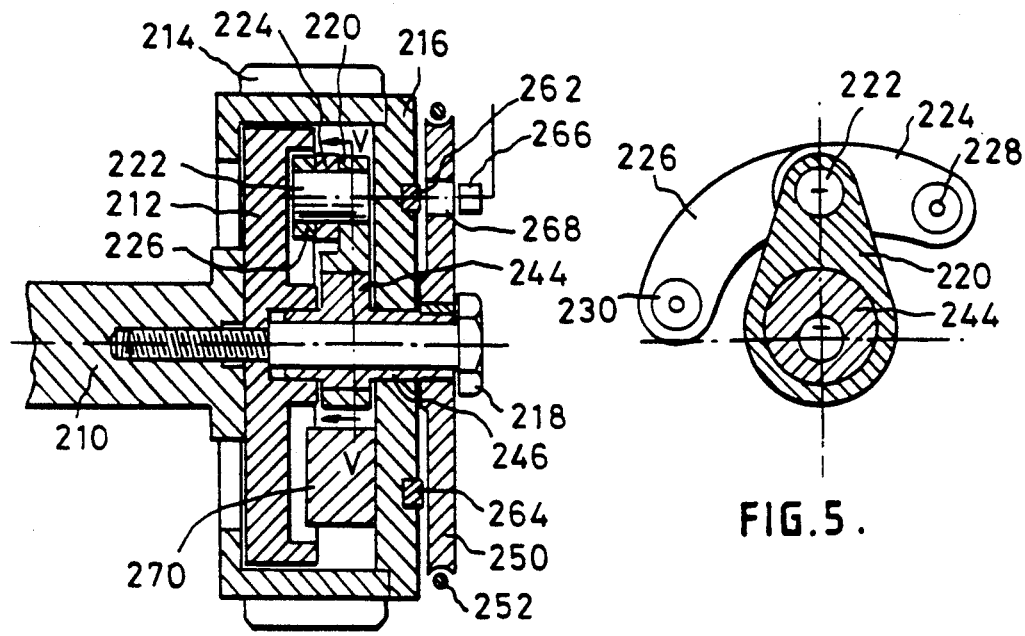
FIG.4.
FIG.5.
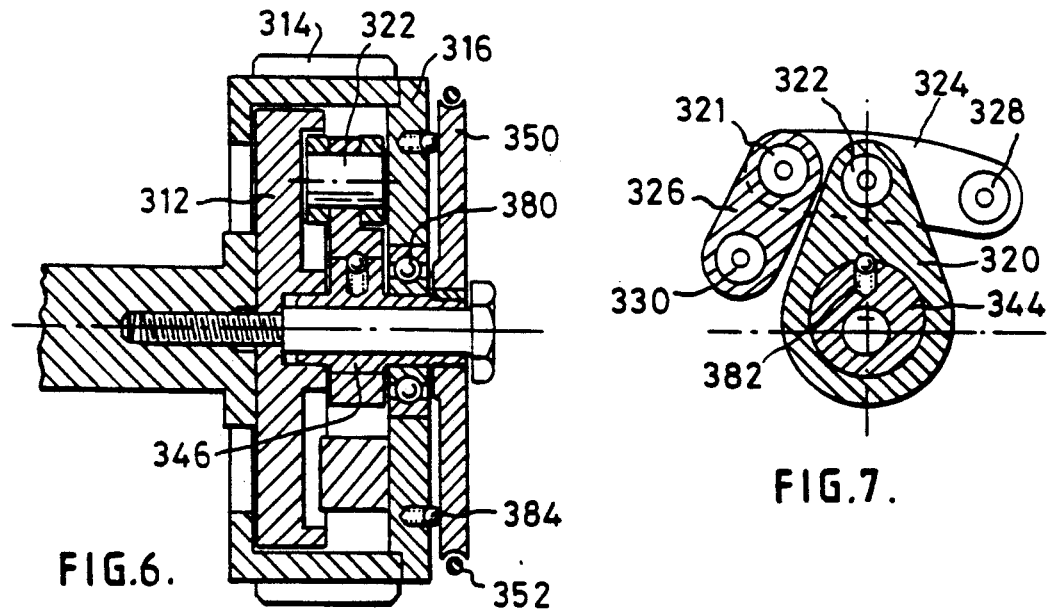
FIG.6.
FIG.7.

PHASE CHANGE MECHANISM

TECHNICAL FIELD

The invention relates to a phase change mechanism for varying the phase of a driven member relative to a drive member. The invention can be used for the camshaft of an internal combustion engine for varying the relative phase of opening and closing of the inlet and exhaust valves in a dual overhead camshaft internal combustion engine.

The optimum times for opening and closing the inlet and exhaust valves in an internal combustion engine vary with operating parameters such as engine load and speed. In any engine with fixed angles for opening and closing the valves for all engine operating conditions, the valve timing is a compromise which detracts from the engine efficiency in all but a limited range of operating conditions. For this reason, control systems have been proposed which vary the valve timing during engine operation.

BACKGROUND ART

Most of the prior art proposals employ a linear actuator to set the desired phase shift and they rely on converting the linear movement of the actuator into a rotary movement of the camshaft relative to its drive pulley or gear. One such example has been to include a helical gear on the camshaft and to move the helical gear axially to cause the phase of the camshaft to change.

Phase change mechanisms which convert linear actuation movement into an angular phase shift have certain disadvantages which have prevented their being generally adopted in engine designs intended for mass production. Their space requirements are difficult to satisfy and even more serious problems are presented by the cost, complexity and size of the linear actuating system which they require.

Most previous attempts at actuation have required an external power source. Amongst the proposed sources of force for actuating the phase change mechanism have been electro-mechanical actuators (motors or solenoids), or hydraulic actuators. One complexity resulting from such designs is that supplying current or hydraulic fluid to a rotating actuator is troublesome. If the prime mover is stationarily mounted, then this problem is avoided but creates a new problem in how to couple the force from the prime mover to the phase change mechanism. All such proposals also involve friction losses, exacerbate the packaging problem and add to the manufacturing cost.

To mitigate the foregoing problems, there has been described in co-pending Application No. PCT/GB 89/01256 an actuating system for a phase change mechanism which uses a brake acting on a reaction member to bring about a phase change. Thus, whereas most prior art attempts at adjusting the position of the actuator have employed external active sources of power, the invention in the above application relies on the use of the rotation of the phase change mechanism to bring about the desired operation of the actuator, the only external force required being friction.

The preferred embodiment described in the above application enables continuous control over the phase change over a large range and though this is required for some complex applications, in simpler applications a two position control is quite adequate.

The present invention seeks to provide a phase change mechanism, which can be controlled by an actuating system and allows two position control to be achieved simply and inexpensively.

SUMMARY OF THE INVENTION

According to the present invention, there is provided a phase change mechanism for a camshaft of an internal combustion engine, as hereinafter set forth in claim 1.

The phase change mechanism comprises a drive member to be connected to the camshaft drive, a driven member to be connected to the camshaft; and a coupling element interposed between and movable relative to the drive and driven members. The coupling element is connected for rotation with the drive and driven members in such a manner that the phase of the driven member relative to the drive member is dependent upon the position of the coupling element. The means connecting the coupling element to the drive and driven members permit the coupling element to move between two stable end positions in each of which the force between the coupling element and the connecting means acts along a line passing through the axis of rotation of the drive and driven members. An inertial member is connected to the coupling element by a cranking means which causes the coupling element to move from one stable end position towards the other when the inertial member rotates relative to the drive and driven members, and means are provided for applying a torque to the inertial member in order to vary the speed of rotation of the inertial member relative to the drive and driven members.

In one embodiment of the invention, the inertial member is a reaction member and the means for applying a torque to the reaction member comprises braking means for braking the reaction member.

In this case, if no external torque is applied to the reaction member, there will be a torque reaction resulting from the resistance of the valve train tending to act on the cranking means and the magnitude of the torque will depend upon the angular position of the cranking means. However, when the cranking means, the coupling element and the axis of rotation of the drive and driven members all lie in a straight line, there will be no torque reaction. The end positions are stable because only a small torque reaction is experienced by the reaction member in these positions of the cranking means.

A detent engageable by a suitably stiff spring would suffice to hold the reaction member in either of these two stable positions. In both these positions, the phase change mechanism will be solid and will introduce no free play into the camshaft drive train.

An important advantage of the mechanism is that as the reaction member is rotated in the same direction, the phase change will cycle between its two stable positions. Consequently, separate actuators are not required for advancing and retarding the phase.

Electrical, magnetic, mechanical, optical or other sensing means may be provided to determine when the reaction member is in one of the stable positions and which of the two stable positions. A brake band associated with the reaction member can then be operated until such time as it is determined that the phase change mechanism has reached the desired stable position.

In a further development of the invention, the reaction member may be coupled to the drive member by way of a one-way clutch, or ratchet mechanism, which permits rotation of the reaction member in only one direction relative to the drive member. Because of the torque reversals experienced by the drive member when driving a camshaft, the effect of the one-way clutch, or ratchet mechanism, is that once the cranking means has been moved by the reaction member out of one of the stable positions, it will be moved incrementally by the torque reaction until it reaches the other stable position, whereupon no further torque will be applied to it.

This permits further simplification of the control mechanism in that the brake need only be applied for long enough to move the cranking means out of its stable position and the duration of actuation is not critical in that the cranking means will always continue to move until it reaches the other stable position before coming to a stop.

It has been assumed above that the torque reaction from a one way clutch is small in the stable end position but it need not be negligible. On the contrary, in a further simplification of the invention, use may be made of this residual torque to initiate movement without using a brake band. In this case, an inertial member is used in place of the reaction member and cooperates with retractable latching means which positively lock the inertial member in each stable position. Once a latch is released, the inertial member automatically moves towards the other stable position.

BRIEF DESCRIPTION OF THE DRAWINGS

The invention will now be described further, by way of example, with reference to the accompanying drawings, in which:

FIG. 1 is a longitudinal schematic section through a phase change mechanism of the invention taken along the line I—I in FIG. 3, FIG. 2 is a similar longitudinal schematic section taken along the line II—II in FIG. 3, FIG. 3 is a transverse section taken along the line III—III in FIG. 1, FIG. 4 is a longitudinal schematic section through an alternative phase change mechanism of the invention, FIG. 5 is a schematic partial section through the embodiment of FIG. 4 taken along the line V—V to demonstrate all the elements of the linkage between the drive and driven members, FIG. 6 is an axial section similar to that of FIG. 4 through a further phase change mechanism of the invention, FIG. 7 is a schematic partial section similar to that of FIG. 5 through the embodiment of FIG. 6 to demonstrate all the elements of the linkage between the drive and driven members.

DETAILED DESCRIPTION OF THE PREFERRED EMBODIMENTS

Figure 8:
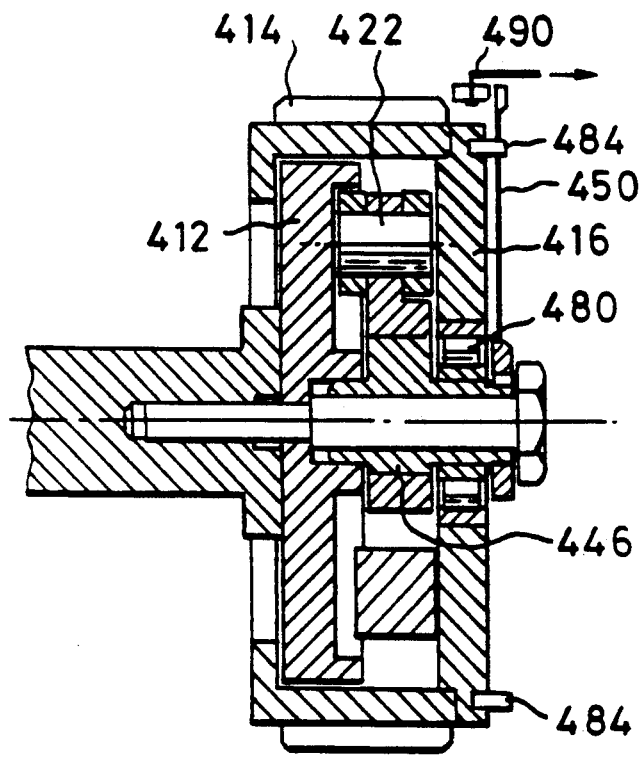
FIG. 8 is a further section similar to that of FIG. 4 through a yet another phase change mechanism of the invention.

Referring first to FIGS. 1 to 3, a camshaft 10 has mounted on its end the back plate 12 or driven member of a phase change mechanism. A cog 14 is journalled about the back plate 12 and is connected to a front cover plate 16 which acts as the drive member of the phase change mechanism. The camshaft 10 is concentric with both the front plate 16 and the back plate 12 of the phase change mechanism but is rotationally fixed only with the back plate 12.

A coupling element in the form of a disc 20 is sandwiched between the front plate 16 and the back plate 12 and is coupled to both of these in order to transmit torque from the front plate 16 to the back plate 12. On its side facing the front plate 16, the coupling disc 20 has a guide groove 22 in which two slide blocks 24 are received. The slide blocks 24 are in turn connected to pins 26 which are fixed to the front plate. In this way, torque can be transmitted from the front plate 16 to the coupling disc 20 but the latter may move into an eccentric position relative to the rotational axis of the camshaft 10 along the slide axis of the guide groove 22.

A similar arrangement connects the coupling disc 20 to the back plate 12. The side of the coupling disc 20 facing which receives a single slide block 34 rotatably connected by a pin 36 to the back plate 12. The two grooves 22 and 32 in the coupling disc 20 are transverse to one another and preferably mutually orthogonal. The single slide block 34 acts as a crank connecting the coupling disc 20 for rotation with the back plate but permitting both displacement of the coupling disc 20 to an off-centre position and slight rotation of the coupling disc relative to the back plate 12.

If the coupling disc 20 is moved by some external agency along the slide axis of the groove 22 (see FIG. 3), it will act on the pin 36 to crank the camshaft, causing a phase change to be introduced between the front and back plates 16 and 12. The angle of phase shift about the camshaft axis is designated by 0 in the drawing and is given by the equation:

$$\tan \phi = \frac{\text{vertical displacement}}{\text{crank radius}}$$

To enable the coupling disc to be moved along the groove 22, a second groove 38 is formed in the side of the coupling disc 20 facing the front plate 16 and extending at right angles to the groove 22. A large slide block 40 is arranged in the groove 38 and is formed with a cylindrical aperture 42 within which there is received an eccentric circular cam 44 formed integrally with a hollow shaft 46 journalled at its ends in the front and back plates 16 and 12.

A reaction member in the form of a braking disc 50 associated with a brake band 52 is keyed onto the end of the hollow shaft 46 and a bolt 18 passing through the centre of the hollow shaft 46 serves to retain the braking disc on the hollow shaft and to secure the phase change mechanism to the camshaft 10.

In the absence of the application of a braking force to the disc 50 the only forces acting on the coupling disc 20 are the reaction torque resulting from the resistance of the valve train. This torque is totally resisted in the two positions in which the lobe of the cam 44 is aligned with the axis of the groove 22. These two are therefore stable positions when negligible effort is required to retain the coupling disc stationary in relation to the front and back plates 1 and 12. Spring biased detents 60 shown in FIG. 2 serve to locate the braking disc 50, which is fixed relative to the cam 44, in these two positions.

Having now defined a mechanism with only two stable angles of relative phase shift, it remains only to describe how one or other of these two positions may be selected.

In order to bring about a change in the phase of operation of a camshaft, the latter must be rotated and the torque required to bring about a rapid change in phase is quite considerable. In the described embodiment, the necessary torque for causing the shift in phase is derived from the rotation of the camshaft itself. A braking force is applied to the braking disc 50 by the brake band 52 (a brake calliper may alternatively be employed). This causes the disc 50 to slow down relative to the phase change mechanism and thus rotates the cam 44 to move the coupling disc. On reaching the new stable position, the brake is released and once again all the components of the phase change mechanism rotate in unison. If full braking is applied, the entire phase change can be brought about in one half of a rotation of the camshaft but a more gradual and better controlled change-over takes place if the disc 50 is braked more gently.

It can be seen that continuous rotation of the cam 44 in the same direction will result in the phase being cyclically advanced and retarded. There is no requirement for reversal of the direction of relative motion of the braking disc and continued braking will achieve both advance and retard of the phase angle.

Any of a variety of means may be used to determine the prevailing setting of the phase angle, to permit feedback for the control of the braking. In the embodiment illustrated, two magnets 62 and 64 of opposite polarity are fitted to the pins 26 and a hole 68 in the braking disc 50 allows a sensor 66 to determine the polarity of the magnets align with the hole. Of course, electrical contacts or other forms of transducer may be used to achieve the same result.

The phase change mechanism is a bistable device with the same operation required for switching from either state to the other. The change operation requires the application of a braking force to the brake disc and removal of the braking force when the other stable state has been detected.

The total amount of phase change, corresponding to twice the angle $\phi$ in the drawing, depends on the cranking radius of pin 36 and on the eccentricity of the cam 44. The former parameter cannot readily be changed and in any event contributes relatively little to the phase angle. On the other hand, it is a relatively simple matter to substitute for the cam 44 one with different eccentricity and this allows considerable economies in production to be achieved since the only component that needs to be changed in the phase change mechanism to permit it to suit a wide range of applications is the cam 44.

Because of the resemblance between the phase change mechanism and a so-called Oldham coupling, it is inherently tolerant of misalignment between the various rotating components. The tolerance in the manufacture of the individual components is not critical and for smooth quiet operation, it is only important that the various slide blocks should fit their respective grooves with accuracy. Even there, because of the little relative movement that occurs in use, nylon bearing surfaces may be used to achieve long term reliability.

As described above, the phase change mechanism is mounted on the end of the camshaft, but it is alternatively possible for it to be mounted on the crankshaft. In this case, the phase of both camshafts would be altered at the same time. This may be desirable for certain applications, such as control of exhaust gas recirculation.

It is further possible to provide phase change mechanisms both on the camshafts and the crankshaft to afford a greater degree of control.

Turning now to FIGS. 4 and 5, these show an embodiment in which a pair of pivoting links 224, 226 is substituted for the arrangement Oldham type of coupling employed in the previously described embodiment.

The arrangement of the camshaft 210, the back plate 212 the cog 214 is the same as in the embodiment of FIG. 1 and will not be described again in detail.

A coupling element in the form of a cranking arm 220 is sandwiched between the front plate 216 and the back plate 212. In order to transmit torque from the drive member to the driven member, the coupling element 220 has a pin 222 on which are pivoted the two links 224 and 226. The link 224 is pivoted at its other end about a pin 228 fixed to the front plate 216 and the link 226 is pivoted at its other end about a pin 230 which is fixed to the back plate 212.

If the coupling element 220 is moved so that the pin 222 follows an arc centred on the pin 228 it will carry with it the link 226 and thereby cause the back plate 212 to rotate relative to the front plate 216. Put differently, the separation of the pins 228 and 230, and therefore the phase of the input member relative to the output member will depend on the position of the pin 222 in relation to the line joining the centres of the pins 228 and 230.

To enable the pin 222 to move along a displacement line transverse to the line joining the centres of the two pins 228 and 230, an arrangement similar to that described with reference to FIG. 1 is employed. This arrangement includes an eccentric crank 244 formed on a hollow shaft 246 associated with a braking disc 250 and a brake band 252. To avoid repetition, the same reference numerals have been employed but prefixed by a "2".

As earlier described, when no braking force is applied to the disc 250 the only forces acting on the coupling element 220 are the reaction force resulting from the resistance of the valve train. This force is totally resisted in the two positions in which the lobe of the cam 244 lies on the line joining the pin 222 to the centre or rotation of the phase change mechanism. By correct choice of geometry it is possible to ensure that two stable positions will exist when negligible effort is required to retain the coupling element stationary in relation to the front and back plates 216 and 212. Spring biased detents (not shown) serve to locate the braking disc 250, which is fixed relative to the cam 244, in these two positions.

The total amount of phase change in this embodiment depends on the geometry of the linkage and the eccentricity of the cam 244. By a relatively simple change in the length of the links 224, 226 and/or the eccentricity of the cam 244 the amount of phase change can be selected at will. This again allows economies in production to be achieved since only a few components need to be changed in the phase change mechanism to permit it to suit a wide range of applications.

The mechanism described is inherently tolerant of misalignment between the various rotating components. The tolerance in the manufacture of the individual components is not critical and for smooth quiet operation, it is only important that the various pins should be properly journalled.

It is an advantage of the embodiment shown in FIGS. 4 and 5 that little change in the moment of inertia of the phase change mechanism occurs in the different positions of the linkage. Consequently, a fixed balanced mass, such as shown at 270 in FIG. 1, can be used to balance the mechanism so as to avoid it introducing any vibration. If desired, a movable balance mass may be employed mounted for movement by a cam of the opposite phase to the cam 244 but it is not believed that this level of complexity will be justified.

The embodiment of FIGS. 6 and 7 is a development of that described in FIGS. 4 and 5 and only important differences between the embodiments will be discussed. The reference numerals in FIGS. 6 and 7 have been prefixed by a "3" instead of a "2" in respect of components serving the same or an analogous function.

As best shown in FIG. 7, the geometry of the linkage comprising the links 326 and 324 is different from that of FIG. 5. The links 224 and 226 in FIG. 5 lie in different planes from one another and from the plane of the link 326. This results in a twisting moment being applied to the pin 222. In FIG. 7, the link 326 lies in the same plane as the crank arm 320 and the link 324 consists of two parallel limbs straddling the crank arm 320 and the link 326. The forces acting on the pins 321 and 322 are therefore symmetrical about the plane of the crank arm 320.

The use of two pins 322 and 321 in the place of the pin 222 also results in a mechanical advantage permitting larger phase shifts to be achieved and it is possible to vary the total amount of phase change without even changing the cam 344.

Instead of the hollow shaft 246 being journalled in the plate 216, in FIG. 6 a one way clutch, also known as an over-running clutch, is disposed between the hollow shaft 346 and the plate 316. When the lobe of the cam 344 is not aligned with the pin 322, the crank arm 320 will be subjected, as earlier described, to a torque reaction tending to make it turn. The torque reaction undergoes reversal but if a one way clutch is incorporated in the manner described the effect of the torque reaction will always be to turn the crank arm 320 in the same direction.

The use of a one way clutch 380, or an equivalent ratchet mechanism, permits the control system of the phase change mechanism to be simplified since all that is now required of the brake band is to move the crank arm 320 out of its stable position sufficiently to experience a torque reaction, and thereafter this reaction will operate to move the phase change mechanism to its other stable position where it will remain until reactivated. The control system need no longer include means for providing positional feedback but detents may be needed to lock the crank arm 320 in its stable positions. To this end, spring biased detents 382 and 384 may act on the hollow shaft 346 and on the brake disc 350 to locate the crank arm 320 securely until the brake band 352 is operated.

The embodiment of FIG. 8 is a modification of that described in FIGS. 6 and 7. The reference numerals in FIGS. 6 and 7 have been prefixed by a "4" instead of a "3" in respect of components serving the same or an analogous function.

The essential difference in the embodiment of FIG. 8 is that braking means have been omitted altogether and reliance is instead made on the one-way clutch to initiate movement of the inertial member 450. In place of detents 384, there are now releasable latching means formed by pins 484 on the drive member 416 co-operating with holes in the inertial member 450.

The member 450 is in this case resilient and requires the application of an external force to release it from the pin 484. As illustrated, a solenoid actuated roller 490 leans on the surface of the resilient inertial member 450 and when it is desired to disengage the latch, the solenoid is energised to raise the resilient inertial member 450 off the pin 484 when next the pin 484 is aligned with the roller 490.

I claim:

1. A phase change mechanism for a camshaft of an internal combustion engine, comprising
   a drive member 14, 214, 314 to be connected to a camshaft drive,
   a driven member 12, 212, 312 to be connected to the camshaft 10, 210, 310; and
   a coupling element 20, 220, 320 interposed between and movable relative to the drive and driven members,
wherein
   said coupling element is connected by connecting means 24, 26, 32, 224, 226, 324, 326 for rotation with the drive and driven members in such a manner that the phase of the driven member relative to the drive member is dependent upon the position of the coupling element 20, 220, 320, with said connecting means permitting the coupling element 20, 220, 320 to move between two stable end positions in each of which the force between the coupling element and the connecting means acts along a line passing through the axis of rotation of the drive and driven members,
   an inertial member 50, 250, 350 is connected to the coupling element 20, 220, 320 by a cranking means 44, 244, 344 operative to cause the coupling element to move from one stable end position towards the other when the inertial member rotates relative to the drive and driven members,
   means are provided for applying a torque to the inertial member in order to vary the speed of rotation of the inertial member relative to the drive and driven members,
   wherein the inertial member is a reaction member and the means for applying a torque to the reaction member comprises braking means for braking the reaction member.

2. A phase change mechanism as claimed in claim 1, wherein at least one detent (60) is provided for retaining the reaction member in each of said two stable positions.

3. A phase change mechanism as claimed in claim 2, further comprising sensing means for determining the position of the coupling element relative to the drive and driven members.

4. A phase change mechanism as claimed in claim 3, wherein the sensing means forms part of a control loop for releasing the braking force applied to the reaction member when the coupling element is near a stable position.

5. A phase change mechanism as claimed in claim 2, wherein the reaction member is coupled to the drive member by way of a mechanism which permits rotation of the reaction member in only one direction relative to the drive member.

6. A phase change mechanism as claimed in claim 1, wherein the coupling element is in the form of a disc connected to the drive and driven members in a manner which permits the disc to slide laterally relative to both the drive and driven members.

7. A phase change mechanism as claimed in claim 1, wherein the coupling element is a crank arm connected by pivotable links to the drive and driven members.

8. A phase change mechanism as claimed in claim 1, wherein the means for applying a torque to the inertial member comprises a one-way clutch (480) transmitting torque to the inertial member (450) in only one direction from torque fluctuations occurring naturally in the drive train.

9. A phase change mechanism as claimed in claim 8, wherein the inertial member (450) is resiliently biased and cooperates with pins (484) to lock the inertial member in each of the two stable end positions, and wherein means are provided for releasing the latching between the inertial member (450) and the pins (484) to permit the inertial member to be driven by the one-way clutch mechanism towards the other stable position.

10. A phase change mechanism as claimed in claim 1, wherein the internal combustion engine has two camshafts for controlling intake and exhaust valves of the engine, and said phase change mechanism connected to at least one of the two camshafts for varying the rotational phase of the respective camshaft relative to that of the engine crankshaft so as to vary the crankshaft angle at which valves operated by the respective camshaft open and close.

* * * * *